Dec. 14, 1965   G. R. LE PLAE   3,222,769
METHODS OF MAKING STRIP STRUCTURES
Filed Dec. 22, 1961

INVENTOR.
GEORGE R. LePLAE
BY
Meyer, Baldwin, Doran & Egan
ATTORNEYS

United States Patent Office 3,222,769
Patented Dec. 14, 1965

3,222,769
METHODS OF MAKING STRIP STRUCTURES
George R. Le Plae, Detroit, Mich., assignor to Backstay Welt Company, Inc., Union City, Ind., a corporation of Indiana
Filed Dec. 22, 1961, Ser. No. 161,560
5 Claims. (Cl. 29—413)

This invention relates to strip structures and more particularly, to strip structures of generally channel shape for embracing engagement with and clamping retention on edge flanges or other parts, such as those of automobile bodies, for trimming or finishing purposes. The invention also relates to methods for the manufacture of such strip structures.

The invention has for one of its objects the provision of a strip structure of the aforesaid nature which is characterized by its outstanding flexibility both laterally and longitudinally, by the attractive embossing with which its outer surface may be readily provided, and by the ease with which it may be pressed onto and thereby firmly clamped on an edge flange or other part, regardless of variations in the thickness of said flange or other part, or transverse or longitudinal curvatures therein.

The invention has for a more specific object the provision of a strip structure of the aforesaid nature which comprises a resilient sheet metal core and a flexible enclosing covering therefor, said core being formed by breaking up a one-piece core strip, after its enclosure in said covering, into individual elements in unconnected relationship, with the consequent provision of a strip structure which is of outstanding flexibility.

A further object of the present invention is the provision of a strip structure of the aforesaid nature in which the core thereof is provided with a series of longitudinally disposed, transversely extending and relatively narrow core elements in closely neighboring relationship and which initially were connected intermediate their ends by frangible portions which may be readily broken after the core is enclosed in its flexible covering to thereby provide a strip structure having transversely extending core elements in unconnected relationship for increased core flexibility.

A further object of the present invention is the provision of a core strip for a strip structure of the type wherein the core is enclosed by a yieldable covering, and which core strip comprises a one piece sheet metal member of resilient character and provided with a series of longitudinally disposed, transversely extending core elements which are connected intermediate their ends by frangible webs integral with said transversely extending core elements, said frangible webs being readily broken after enclosure of the core strip by its covering to thereby provide in said covering transversely extending core elements which are unconnected for increased flexibility.

A further object of the present invention is the provision of a strip structure core strip which is provided with a series of longitudinally disposed, transversely extending grooves in closely neighboring relation and which are of a depth sufficient to enable the core strip, after its enclosure in a flexible covering, to be broken up along said grooves, to thereby provide a strip structure having a series of longitudinally disposed, transversely extending core elements in closely neighboring relation and unconnected for increased core flexibility.

A further object of the present invention is the provision of a simple and economical method for the manufacture, on a commercial basis, of strip structures of the aforesaid character, including the step of providing a strip structure core strip of flat form and of one piece character with frangible portions which may be readily broken, the step of enclosing the core strip, while in its flat and unbroken condition, in a flexible covering, and the step of breaking up the core strip, after its enclosure in its covering, into transversely disposed core elements which are unconnected to thereby enable the strip structure to have the desired flexibility, both laterally and longitudinally.

Further objects of the present invention, and certain of its practical advantages, will be referred to in or will be evident from the following description of two strip structures embodying the present invention and the following description of methods for the manufacture of said strip structures, the two strip structures, in completed form and also in various stages of their manufacture, being illustrated in the accompanying drawing, in which FIG. 1 is a perspective view of a strip structure embodying one form of the present invention, the core covering being shown in dot-dash lines in the rear portion of the strip structure in order to indicate the broken apart core elements;

Before specifically describing the strip structures here illustrated for the disclosure of two embodiments of the present invention, it is to be understood that the invention embraces strip structures of other forms. It also is to be understood that the terminology or phraseology herein used is for purposes of description and not of limitation, as the scope of the present invention is denoted by the appended claims.

Figure 1:
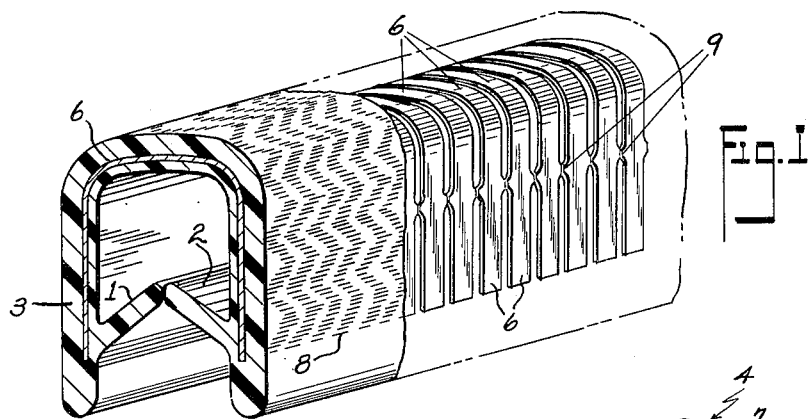
Figure 2:
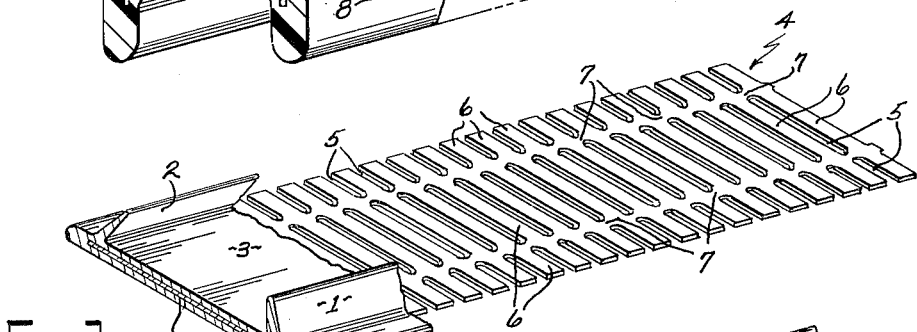
FIG. 2 is a perspective view of the strip structure of FIG. 1 in its flat form prior to bending into channel shape, the strip structure at this stage of its manufacture having a one-piece core strip which is in unbroken condition, and the front end portion of the core strip being shown as enclosed by the core covering with its two longitudinally disposed clamping ribs.
Figure 3:
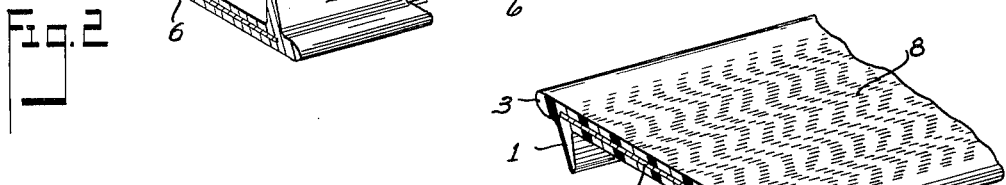
FIG. 3 is a perspective view of the strip structure of FIG. 1 in its flat FIG. 2 form, and showing the decoration of that surface of the core covering which is on the outside of the strip structure when it is in its channel shape.
Figure 4:
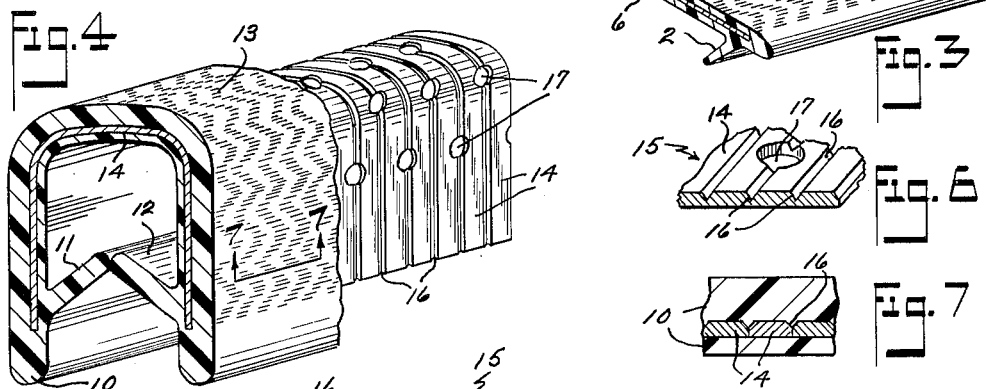
FIG. 4 is a view corresponding to FIG. 1 and showing a strip structure embodying another form of the present invention.
Figure 6:
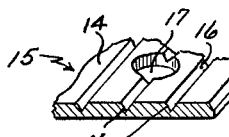
FIG. 6 is a detail perspective view of the core strip of FIG. 4 in its flat, unbroken condition, the view being on the line 6—6 of FIG. 5.
Figure 7:
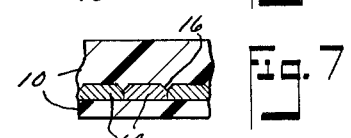
FIG. 7 is a detail perspective view of the strip structure of FIG. 4 after the core strip thereof has been broken up along the transverse grooves thereof to provide individual, unconnected core elements, the view being on the line 7—7 of FIG. 4.

Referring first to the strip structure illustrated in FIGS. 1 to 3 for the disclosure of one embodiment of the present invention, it will be noted that said strip structure is of channel shape for embracing engagement with and clamping retention on an edge flange or other part (not shown), such as an edge flange of an automobile body or an automobile door. For purposes of such embracing engagement and clamping retention, the strip structure is here shown as provided, within the channel thereof, with a pair of opposed and longitudinally extending clamping ribs 1 and 2, the ribs being of flexible character and extending from the inner surfaces of the side walls of the strip structure convergently toward that portion of the strip structure by which its side walls are connected. If desired, the inner or free longitudinal edges of the clamping ribs 1 and 2 may be in subtsantially abutting relation, as here shown, when the strip structure is not in use or in slightly spaced relation at such times, as will be readily understood. Preferably and as here shown, the clamping ribs 1 and 2 are integral parts of the covering 3 of the strip structure, the covering being of any suitable flexible material, such as plasticized vinyl chloride.

Embedded within and enclosed by the covering 3 is a suitable core, which preferably is made of resilient sheet metal and which is of such structural nature that the strip structure has outstanding flexibility, both laterally and longitudinally, to thereby enable it to be readily and freely bent, twisted or otherwise manipulated, without buckling or other objectionable distortion of the covering 3, in applying it to and retaining it on an edge flange or other support.

As shown in FIG. 2, the core for the strip structure constituting the embodiment of FIGS. 1 to 3 is made from a one piece strip 4 of sheet metal, such as thin sheet steel. By conventional and well known means, the core strip 4 is suitably slotted, transversely, as at 5, to provide a series of longitudinally disposed, transversely extending core elements 6 of relatively narrow form and which are connected intermediate their ends in closely neighboring relation by webs 7 which, because of the thinness of the sheet metal core strip and the narrowness of the webs, are of frangible nature and thus capable of being readily broken. Obviously, the number of webs for the connection of the transversely disposed core elements 6 may be varied, as desired, but as here shown, each pair of adjacent core elements is connected by two webs 7, in laterally spaced relation, as best shown in FIG. 2.

Preferably, the core strip 4 is enclosed by its covering 3, as the result of a conventional and well known extruding operation or by the use of any other suitable means, while the core strip is in flat form and unbroken condition, as in FIG. 2. Thereafter, and while the covered core strip is still flat and unbroken and while the core covering is still in a heated condition, the surface of the core covering opposite to that which carries the clamping ribs 1 and 2 may be embossed or otherwise suitably decorated, as at 8, FIGS. 1 and 3, with the embossing or other decoraton being coextensive in width with that of the core strip 4 as it provides for the embossing or other decorating means the required support, as will be evident from FIG. 3.

From its flat FIG. 3 form, the strip structure is bent into channel shape, as in FIG. 1, by any suitable means, preferably one which is continuous in nature, such as conventional and well known forming rolls.

During said bending operation, or before or after it if desired, the frangible webs 7 which connect the transversely extending core elements 6 are broken, as at 9, FIG. 1, by any suitable means, to thereby separate or disconnect said core elements and thereby greatly increase the flexibility of the strip structure, as will be readily understood. Because of their frangible nature, the connecting webs 7 can be readily broken although enclosed within the core covering 3. Therefore, although initially serving the purpose of connecting the core elements 6 in strip form for passage through an extruder or the like for the application of the covering 3 thereto, the webs 7 ultimately do not restrict or reduce flexibility of the strip structure.

From the foregoing, it will be evident that the strip structure of FIGS. 1 to 3 is one which can be readily and economically made, which possesses outstanding flexibility both laterally and longitudinally, which is of quite attractive appearance due to the embossing of its core covering in any desired pattern, and which can be easily pressed onto, and firmly held on, an edge flange or the like for decorative, trim or finishing purposes.

With respect to the strip structure of FIGS. 4 to 7 which embodies another form of the present invention, it will be noted that such strip structure, like the strip structure of FIGS. 1 to 3, includes a core covering 10 having a pair of opposed clamping ribs 11 and 12 and an embossed outer surface 13. It further will be noted that the strip structure of FIGS. 4 to 7, like the strip structure of FIGS. 1 to 3, includes within the covering 10 a core which comprises a series of longitudinally disposed, transversely extending core elements 14 which, in the completed or finished form of the strip structure, are in unconnected relationship for increased core flexibility.

Figure 5:
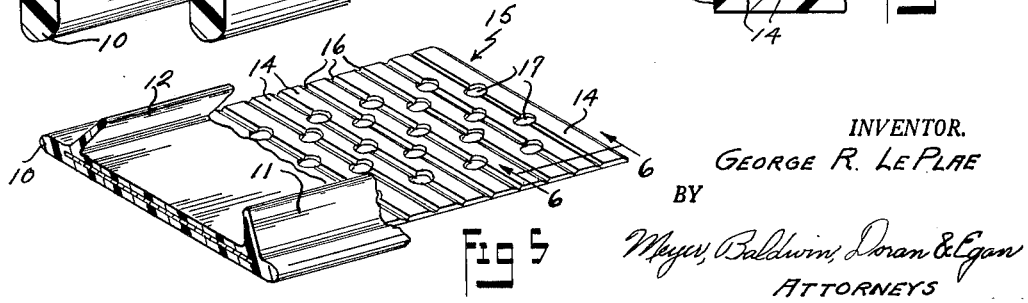
FIG. 5 is a view corresponding to FIG. 2 but showing the strip structure of FIG. 4 in its flat form, with the core strip being in its unbroken condition.

From FIG. 5, it will be evident that the core elements 14 are formed by transversely grooving a flat core strip 15 of resilient sheet metal, the grooves 16 preferably extending completely across the core strip in closely spaced longitudinal relationship and being sufficiently deep to enable the core strip, after its enclosure within the covering 10 by an extruding operation or the like and while the core strip is in flat form, to be broken apart along said grooves. Such breaking apart of the core strip along the grooves 16 can be effected during or as a part of the operation of bending the strip structure into channel shape, or if desired, it can be effected either before or after such bending operation, as will be readily understood.

In order to enable the covering 10 on one side of its core to be bonded to the core covering on the outer side of the core, suitable apertures may be provided in the core strip 15 while it is in its flat unbroken form, such as the apertures 17 which are here shown as located in the grooves 16 in laterally spaced relation. As will be readily understood, no such bonding apertures were provided in the core strip 4 of FIGS. 1 to 3 because of the spacing apart of the transverse core elements 6 by their connecting webs 7.

From the foregoing, it will be evident that the strip structure of FIGS. 4 to 7, like the strip structure of FIGS. 1 to 3, is characterized by its outstanding flexibility, which is chiefly due, of course, to the unconnected nature of the transversely disposed core elements 14.

To those skilled in the art to which the present invention relates, other features and advantages of the present invention will be evident from the foregoing description of two embodiments of the invention and the methods of their manufacture.

What is claimed is:

1. The method of making a generally channel-shaped strip structure for embracing engagement with and clamping retention on an edge flange or other support, said method comprising the step of transversely slotting a one piece sheet metal core strip of resilient character to thereby provide it with a series of longitudinally disposed, transversely extending core elements connected intermediate their ends by frangible means, completely enclosing said core strip in a flexible covering, and breaking said frangible connecting means while the core strip is in its covering to thereby disconnect said transversely disposed core elements for increased core flexibility.

2. The method of making a generally channel-shaped strip structure for embracing engagement with said clamping retention on an edge flange or other support, said method comprising the step of transversely slotting a one piece sheet metal core strip of resilient character to thereby provide it with a series of longitudinally disposed, transversely extending core elements connected intermediate their ends by frangible means integral with said core members, completely enclosing said core strip in a flexible covering, and breaking said frangible connecting means while the core strip is within its covering to thereby disconnect said transversely disposed core elements for increased core flexibility.

3. The method of making a generally channel-shaped strip structure for embracing engagement with and clamping retention on an edge flange or other support, said method comprising the step of transversely slotting a generally flat one piece sheet metal core strip of resilient character to thereby provide it with a series of longitudinally disposed, transversely extending core elements connected intermediate their ends by frangible means, completely enclosing said core strip while in its substantially flat condition in a flexible covering, and breaking said frangible connecting means while the core strip is in its covering and while the covered core strip is being bent into channel shape to thereby disconnect said transversely disposed core elements for increased core flexibility.

4. The method of making a generally channel-shaped strip structure for embracing engagement with and clamping retention on an edge flange or other support, said method comprising the step of providing a one piece sheet metal core strip of resilient character with a series of longitudinally disposed, transversely extending grooves, completely enclosing said core strip in a flexible covering, and breaking up said core strip while in its covering along said grooves to thereby provide transversely disposed unconnected core elements for increased core flexibility.

5. The method of making a generally channel-shaped strip structure for embracing engagement with the clamping retention on an edge flange or other support, said method comprising the step of providing a one piece sheet metal core strip of resilient character with a series of longitudinally disposed, transversely extending grooves and with apertures extending through the core strip adjacent said grooves, completely enclosing said grooved and apertured core strip in a flexible covering, and breaking up said core strip along said grooves to thereby provide transversely disposed unconnected core elements for increased core flexibility, the apertures enabling the core covering on one side of said strip structure to be bonded to the core covering on the other side of the strip structure.

References Cited by the Examiner
UNITED STATES PATENTS

| | | | |
|---|---|---|---|
| 1,407,709 | 2/1922 | Tibbals | 85—49 |
| 1,756,448 | 4/1930 | Bigney | 29—413 |
| 1,867,313 | 7/1932 | Gaines | 296—44.5 |
| 1,918,666 | 7/1933 | Reid | 20—69 X |
| 2,021,274 | 11/1935 | Vogel | 85—49 |
| 2,058,793 | 10/1936 | Hoffman | 20—69 X |
| 2,202,905 | 6/1940 | Goodstein | 85—49 |
| 2,242,794 | 5/1941 | Puschner | 29—533 |
| 2,399,204 | 4/1946 | Cameron | 20—69 X |
| 2,569,709 | 10/1951 | Elmendorf | 52—403 X |
| 2,635,915 | 4/1953 | McKinney | 296—44.5 |
| 2,686,691 | 8/1954 | Burrell | 52—11 X |
| 2,746,103 | 5/1956 | Bright | 20—69 |
| 2,954,310 | 9/1960 | Truesdell et al. | 52—207 X |
| 3,128,667 | 4/1964 | Tremblay | 85—49 |

RICHARD W. COOKE, JR., *Primary Examiner.*

JACOB L. NACKENOFF, *Examiner.*